United States Patent
Masuko

(10) Patent No.: US 9,792,634 B2
(45) Date of Patent: Oct. 17, 2017

(54) INFORMATION PROCESSING DEVICE, INFORMATION PROCESSING METHOD, TERMINAL DEVICE, INFORMATION PROCESSING PROGRAM, AND STORAGE MEDIUM

(75) Inventor: Soh Masuko, Shinagawa-ku (JP)

(73) Assignee: Rakuten, Inc., Tokyo (JP)

( * ) Notice: Subject to any disclaimer, the term of this patent is extended or adjusted under 35 U.S.C. 154(b) by 0 days.

(21) Appl. No.: 13/636,879

(22) PCT Filed: Mar. 31, 2011

(86) PCT No.: PCT/JP2011/058235
§ 371 (c)(1),
(2), (4) Date: Sep. 24, 2012

(87) PCT Pub. No.: WO2011/125847
PCT Pub. Date: Oct. 13, 2011

(65) Prior Publication Data
US 2013/0013403 A1    Jan. 10, 2013

(30) Foreign Application Priority Data

Mar. 31, 2010   (JP) .............................. P2010-080905

(51) Int. Cl.
*G06Q 30/06* (2012.01)
*G06Q 10/08* (2012.01)
*G06Q 30/02* (2012.01)

(52) U.S. Cl.
CPC ....... *G06Q 30/0603* (2013.01); *G06Q 10/087* (2013.01); *G06Q 30/02* (2013.01)

(58) Field of Classification Search
USPC .... 705/28, 21, 16, 7.12, 26.8, 333; 345/419; 382/164; 235/375, 383
See application file for complete search history.

(56) References Cited

U.S. PATENT DOCUMENTS

| | | | | |
|---|---|---|---|---|
| 7,610,219 | B2* | 10/2009 | Sayed | 705/26.2 |
| 7,628,319 | B2* | 12/2009 | Brown et al. | 235/375 |
| 7,996,283 | B2* | 8/2011 | Oya | 705/28 |
| 8,321,302 | B2* | 11/2012 | Bauer et al. | 705/28 |
| 8,428,752 | B2* | 4/2013 | Bennett | G06Q 30/0207 700/17 |
| 2002/0154114 | A1* | 10/2002 | Christensen | G06Q 10/087 345/419 |

(Continued)

FOREIGN PATENT DOCUMENTS

| | | |
|---|---|---|
| JP | 10-091711 A | 4/1998 |
| JP | 2006204748 A | 8/2006 |

(Continued)

*Primary Examiner* — Vanel Frenel
(74) *Attorney, Agent, or Firm* — Sughrue Mion, PLLC

(57) ABSTRACT

The present invention includes: acquiring inventory information related to the number of stock of a product, from a product storage means which stores the inventory information and acquiring a product image showing an image related to the product, from a product image storage means which stores the product image (S1), generating a web page for causing the product image which changes in response to the number of stock to be displayed on a terminal device and transmitting the generated web page to the terminal device to display (S3 to S7).

15 Claims, 18 Drawing Sheets

(56) References Cited

U.S. PATENT DOCUMENTS

| | | | |
|---|---|---|---|
| 2003/0014317 A1* | 1/2003 | Siegel | G06Q 10/087 705/22 |
| 2003/0154141 A1* | 8/2003 | Capazario et al. | 705/27 |
| 2005/0114703 A1* | 5/2005 | Allen | G06Q 30/02 726/4 |
| 2008/0207296 A1* | 8/2008 | Lutnick et al. | 463/16 |
| 2008/0208622 A1 | 8/2008 | Fullerton et al. | |
| 2009/0018929 A1* | 1/2009 | Weathers, Jr. | 705/27 |
| 2010/0070324 A1* | 3/2010 | Bock et al. | 705/8 |
| 2011/0047023 A1* | 2/2011 | Lieblang | G06Q 30/02 705/14.36 |
| 2011/0184831 A1* | 7/2011 | Dalgleish | G06Q 30/02 705/26.7 |
| 2012/0072431 A1* | 3/2012 | Berlener et al. | 707/748 |
| 2012/0136759 A1* | 5/2012 | Roslak | G06Q 10/087 705/28 |

FOREIGN PATENT DOCUMENTS

| | | |
|---|---|---|
| JP | 2008-209812 A | 9/2008 |
| JP | 2009-032169 A | 2/2009 |
| JP | 2009-294909 A | 12/2009 |
| WO | 2005/119540 A1 | 12/2005 |

* cited by examiner

| NUMBER OF STOCK (NUMBER OF ITEMS) | PRODUCT IMAGE |
|---|---|
| 1～9 |  |
| 10～99 |  42a |
| 100～999 | 41a |
| 1000～9999 |  40a |

# INFORMATION PROCESSING DEVICE, INFORMATION PROCESSING METHOD, TERMINAL DEVICE, INFORMATION PROCESSING PROGRAM, AND STORAGE MEDIUM

CROSS REFERENCE TO RELATED APPLICATIONS

This application is a National Stage of International Application No. PCT/JP2011/058235 filed Mar. 31, 2011, claiming priority based on Japanese Patent Application No. 2010-080905, filed Mar. 31, 2010, the contents of all of which are incorporated herein by reference in their entirety.

TECHNICAL FIELD

The present invention relates to a technical field of an information processing device, an information processing method, a terminal device, an information processing program and a storage medium which process information related to a product at a shopping site on the Internet.

BACKGROUND ART

Various systems are proposed which make users enjoy shopping by giving to users the same sense as a sense of doing shopping at a real shop even at virtual stores such as shopping sites which sell products on the Internet. For example, Patent Document 1 discloses a store device which generates a product image from attribute data of a product and displays the product image in a background image such as a store shelf based on product arrangement data or product position data of this product image to display a product image which reflects the size, color and design, and the quantity of a product at a real store as is in the size, color and design and the quantity of a product at a virtual store in almost real time and without manpower.

CITATION LIST

Patent Document

Patent Document 1: WO2005/119540

SUMMARY OF THE INVENTION

Problem to be Solved by the Invention

However, the conventional technique reflects content of a real store as is, and therefore it is difficult in some cases to accurately comprehend the quantity of inventory of a product due to the type of products and a way of product arrangement at the store. Further, both of a store side which supplies products and a user side which purchases products have difficulty in easily comprehending the change in the number of stock.

The present invention is made in light of this problem, and an example of an object is to provide, for example, an information processing device which enables a store wide which supplies products and users who purchase products to accurately comprehend the number of stock and share a situation in which the number of stock is updated by accurately visualizing inventory information and a change in the inventory information.

Means for Solving the Problem

In order to solve the above problem, the invention described in claim 1 includes: an information acquiring means which acquires inventory information related to the number of stock of a product from a product storage means which stores the inventory information, and acquires a product image showing an image related to the product from a product image storage means which stores the product image; a web page generating means which generates a web page for causing the product image in response to the number of stock to be displayed on a terminal device; and a transmitting means which transmits the web page to the terminal device.

In the information processing device described in claim 1, the invention described in claim 2 is characterized in that the information processing device further includes an image setting means that sets a product image in response to the number of stock.

In the information processing device described in claim 2, the invention described in claim 3 is characterized in that the image setting means sets a size of the product image in response to the number of stock.

In the information processing device described in claim 2 or 3, the invention described in claim 4 is characterized in that the image setting means makes a setting to overlap on part of the product image in response to the number of stock a product image different from the product image.

In the information processing device described in claim 2 or 3, the invention described in claim 5 is characterized in that the image setting means sets pixel information of the product image in response to the number of stock.

In the information processing device described in any one of claims 1 to 5, the invention described in claim 6 is characterized in that the information processing device includes an alternative display means that, when the number of stock is a predetermined number or less, causes a product image of another product to be displayed instead of the product image.

In the information processing device described in claim 6, the invention described in claim 7 is characterized in that when the number of stock is a predetermined number or less, the alternative display means causes an advertisement related to another product to be displayed alternatively.

In the information processing device described in any one of claims 1 to 7, the invention described in claim 8 is characterized in that the information processing device further includes a display position changing means that changes a display position of the product image in the web page in response to the number of stock.

In the information processing device described in claim 8, the invention described in claim 9 is characterized in that the information processing device further includes a product image specifying means that specifies a product image corresponding to the case that the number of stock is a predetermined number or less, wherein, when the product image specifying means specifies a plurality of product images, the display position changing means changes display positions such that the plurality of product images are displayed in a predetermined area of the web page.

In the information processing device described in claim 8 or 9, the invention described in claim 10 is characterized in that when changing the display position of the product image, the display position changing means arranges a product image of a product in which the number of stock is a predetermined number or more, in the position before the change.

The invention described in claim 11 is characterized in that an information processing method of processing information in an information processing device including: an information acquiring step of acquiring inventory information related to the number of stock of a product from a product storage means that stores the inventory information, and acquiring a product image showing an image related to the product from a product image storage means that stores the product image; a web page generating step of generating a web page for causing the product image in response to the number of stock to be displayed on a terminal device; and a transmitting step of transmitting the web page to the terminal device.

The invention described in claim 12 includes: an information acquiring means that acquires inventory information related to the number of stock of a product from a product storage device that stores the inventory information through a network, and acquires a product image showing an image related to the product from a product image storage device that stores the product image through the network; and a display means that causes the product image in response to the number of stock to be displayed on a web page, wherein the information acquiring means acquires the inventory information from the product storage device.

The invention described in claim 13 causes a computer to execute: an information acquiring step of acquiring inventory information related to the number of stock of a product from a product storage means that stores the inventory information, and acquiring a product image showing an image related to the product from a product image storage means that stores the product image; and a display step of causing the product image which changes in response to the number of stock to be displayed on a web page of a terminal device.

In the information processing program described in claim 13, the invention described in claim 14 is characterized in that the information processing program further causes the computer to execute an image setting step of setting a product image in response to the number of stock.

In the information processing program described in claim 14, the invention described in claim 15 is characterized in that the image setting step sets a size of the product image in response to the number of stock.

The invention described in claim 16 has an information processing program recorded thereon which causes a computer to execute: an information acquiring step of acquiring inventory information related to the number of stock of a product from a product storage means that stores the inventory information, and acquiring a product image showing an image related to the product from a product image storage means that stores the product image; and a display step of causing the product image in response to the number of stock to be displayed on a web page of a terminal device.

Effect of the Invention

The present invention accurately visualizes inventory information and a change in the inventory information by acquiring inventory information related to the number of stock of a product from a product storage means which stores the stock information, acquiring a product image showing an image related to the product from a product image storage means which stores the product image, and causing a product image which changes in response to the number of stock to be displayed on a web page of a terminal device, and, consequently, enables a store wide which supplies products and users who purchase products to accurately comprehend the number of stock and share a situation in which the number of stock is updated.

MODES FOR CARRYING OUT THE INVENTION

Hereinafter, an embodiment of the present invention will be described with reference to the drawings. In addition, the embodiment will be described below where the present invention is applied to an image display system.

[1. Outline of Configuration and Functions of Image Display System]

First, an outline of a configuration and functions of an image display system according to an embodiment of the present invention will be described using FIG. 1.

Figure 1:
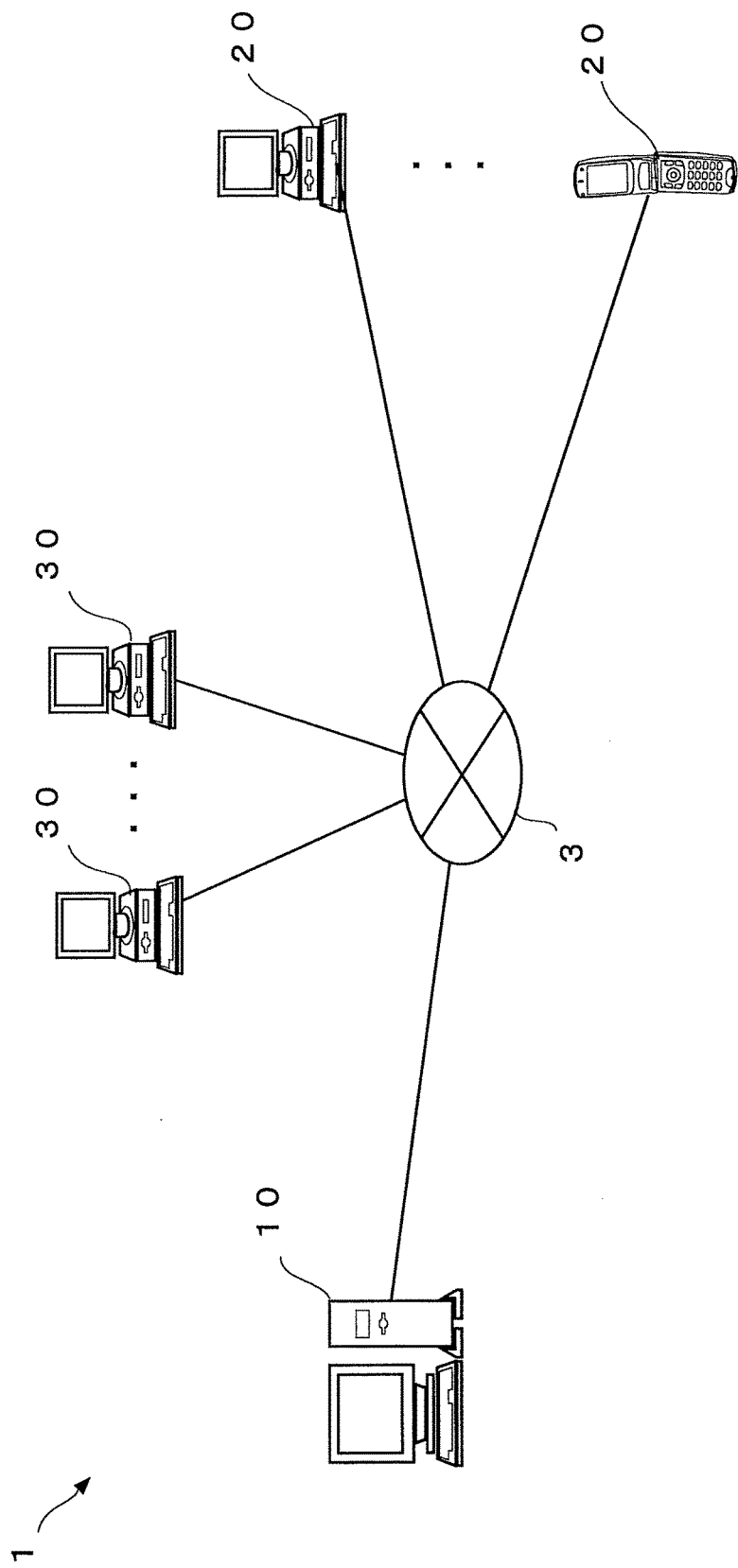
FIG. 1 illustrates a schematic diagram that illustrates a schematic configuration example of an image display system according to an embodiment of the present invention.

FIG. 1 illustrates a schematic diagram that illustrates a schematic configuration example of an image display system 1 according to the present embodiment.

As illustrated in FIG. 1, the image display system 1 has a shopping server (an example of a server device) 10 which is installed to run a shopping site, user terminals 20 (examples of terminal devices) of users who, for example, purchase products at the shopping site and store terminals 30 (examples of terminal devices) of store owners who open stores which sell products at the shopping site.

The shopping server 10, the user terminals 20 and the store terminals 30 are connected through a network 3, and can transmit and receive data to and from each other using, for example, TCP/IP as a communication protocol. In addition, the network 3 is constructed with, for example, the Internet, a dedicated communication line (for example, CATV (Community Antenna Television) line), a mobile communication network (including, for example, base stations), a gateway and the like.

The shopping server 10 functions as, for example, a web server or a database server for selling products at a shopping site, and performs various processings of accepting registration of products from store terminals 30, registering users of the user terminals 20, handling, for example, product purchase procedures and assigning points corresponding to purchase of products. Further, the shopping server 10 acquires information related to the number of stock of a product and a product image showing an image related to the product, controls display of a product image based on the number of stock in reference display of displaying the product image on a web page and generates a web page which includes the controlled product image.

Each user terminal 20 used by a user is, for example, a personal computer, or a mobile terminal such as a mobile wireless telephone or a PDA. The user uses the user terminal 20 to search for a product, look at a web page which enables the user to check inventory information of a product, and purchase the product.

Each store terminal 30 is, for example, a personal computer, or a mobile terminal such as a mobile wireless telephone or a PDA. By using the store terminal 30, the store owner registers products to sell in the shopping server 10 and replenishes products looking at a web page which enables the store owner to check inventory information of the products.

[2. Configuration and Functions of Server and the Like]
[2.1 Configuration and Functions of Shopping Server 10)

Next, a configuration and functions of the shopping server 10 will be described using FIG. 2.

Figure 2:
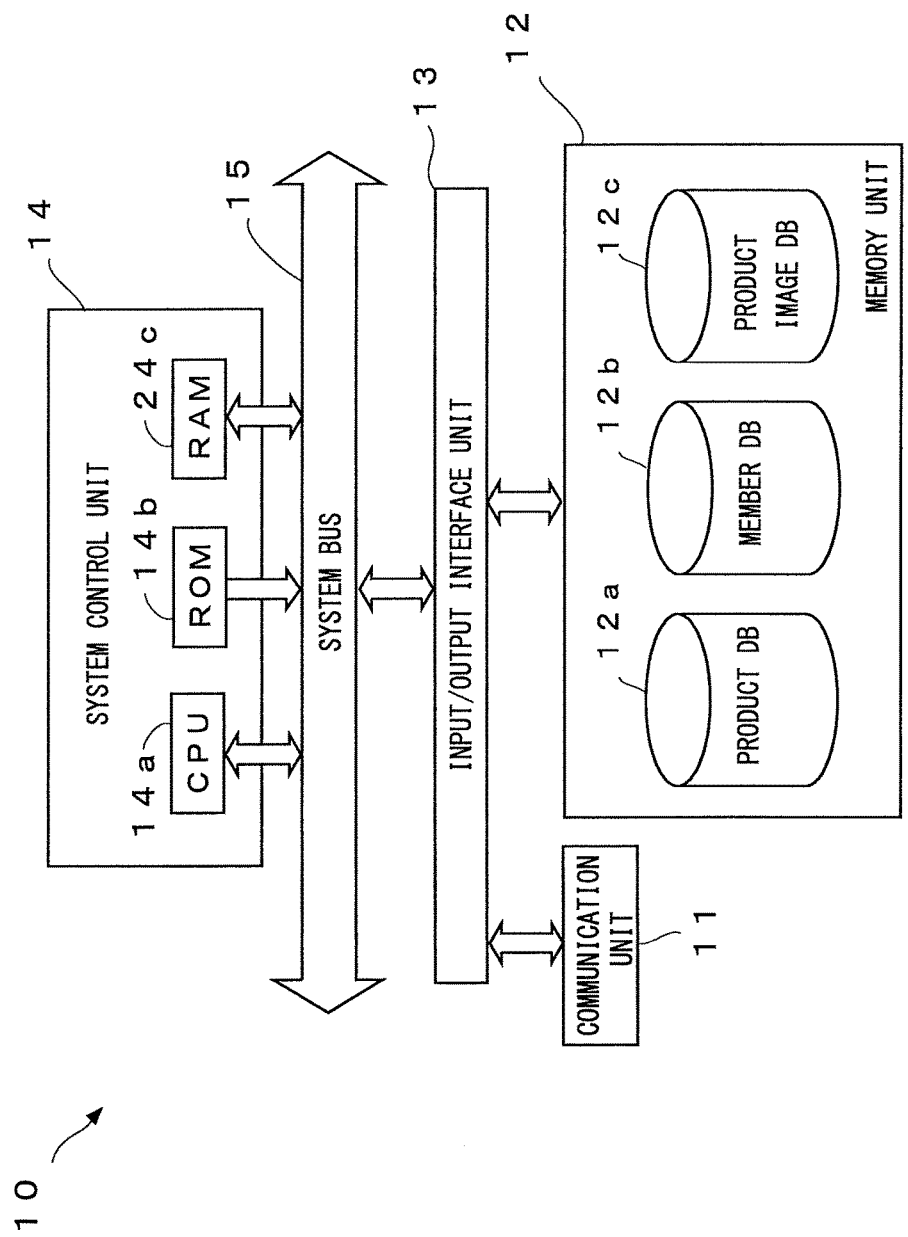
FIG. 2 illustrates a block diagram that illustrates an example of a schematic configuration of a shopping server in FIG. 1.

FIG. 2 illustrates a block diagram that illustrates an example of a schematic configuration of the shopping server 10.

As illustrated in FIG. 2, the shopping server 10 which functions as a computer has a communication unit 11, a memory unit 12 which is an example of a product storage means and a product image storage means, an input/output interface unit 13 and a system control unit 14. Further, the system control unit 14 and the input/output interface unit 13 are connected through a system bus 15.

The communication unit 11 connects to the network 3 and controls a communication states with, for example, the user terminals 20, or connects to a local area network and transmits and receives data to and from another server on the local area network.

The memory unit 12 is configured to include, for example, a hard disk drive, and stores various programs such as an operating system and a server program and data. In addition, for example, the various programs may be acquired from another server device through the network 3, or may be recorded in a storage medium and read through a drive device.

Further, in the memory unit 12, a product database (hereinafter, "product DB") 12a, a member database (hereinafter, "member DB") 12b and a product image database (hereinafter, "product image DB") 12c which stores product images displayed on web pages are constructed.

In the product DB 12a (an example of the product storage means or a product storage device), product information including a product name, a type, a product image, a specification and a summary of introduction of the product, advertisement information and the number of stock of each product which is inventory information are stored in association with a product ID which is an identifier for identifying a product. Further, in the product DB 12a, files of web pages described, for example, by a markup language such as HTML (HyperText Markup Language) or XML (Extensible Markup Language) are stored. The product DB 12a functions as an example of a storage device which stores information related to the number of stock.

In the member DB 12b, user information including a user ID, a name, an address, a telephone number and an electronic mail address of a user (a user of a shopping site) registered as a member, user attributes such as the sex and the age of a user, and points the user has earned is registered. This user information can be identified per user based on a user ID. Further, in the member DB 12b, a user ID, a log-in ID and a password which a user is required to log in a shopping site from the user terminal 20 are registered. Meanwhile, the log-in ID and the password are log-in information used for log-in processing (user authentication processing).

A product image DB 12c (an example of the product image storage means or a product image device) stores per product a product image which is displayed on a web page in a controlled manner in response to the number of stock of a product. Further, a product image for setting display of a product image in response to the number of stocks is also stored, such as a product image obtained by making a size of a product image displayed on a web page small according to a decrease in the number of stock, a product image having the degree of transparency which increases according to a decrease in the number of stock, and an image in which part of a product image of reference display becomes defective according to a decrease in the number of stock, for a product image of reference display having the standard number of pixels when a product image is displayed on the web page. These product images are stored in association with product IDs and the number of stocks. Further, in the product image DB 12c, an advertisement image related to a product image is also stored. The product image DB 12c functions as an example of the storage device which stores a product image.

Next, the input/output interface unit 13 performs interface processing between the communication unit 11 and the memory unit 12, and the system control unit 14.

The system control unit 14 is configured to include, for example, a CPU (Central Processing Unit) 14a, a ROM (Read Only Memory) 14b, and a RAM (Random Access Memory) 14c which is an example of the product storage means and the product image storage means. When the CPU 14a reads and executes various programs stored in the ROM 14b and the memory unit 12, based on a request from the user terminal 20, the system control unit 14 transmits a web page, processes purchase of a product by a user and records point information per user ID. Further, in reference display of displaying a product image on a web page, the system control unit 14 controls display of a product image based on the number of stock, and generates a web page including the controlled product image.

(2.2 Configuration and Functions of User Terminal 20)

Next, a configuration and functions of the user terminal 20 will be described using FIG. 3.

Figure 3:
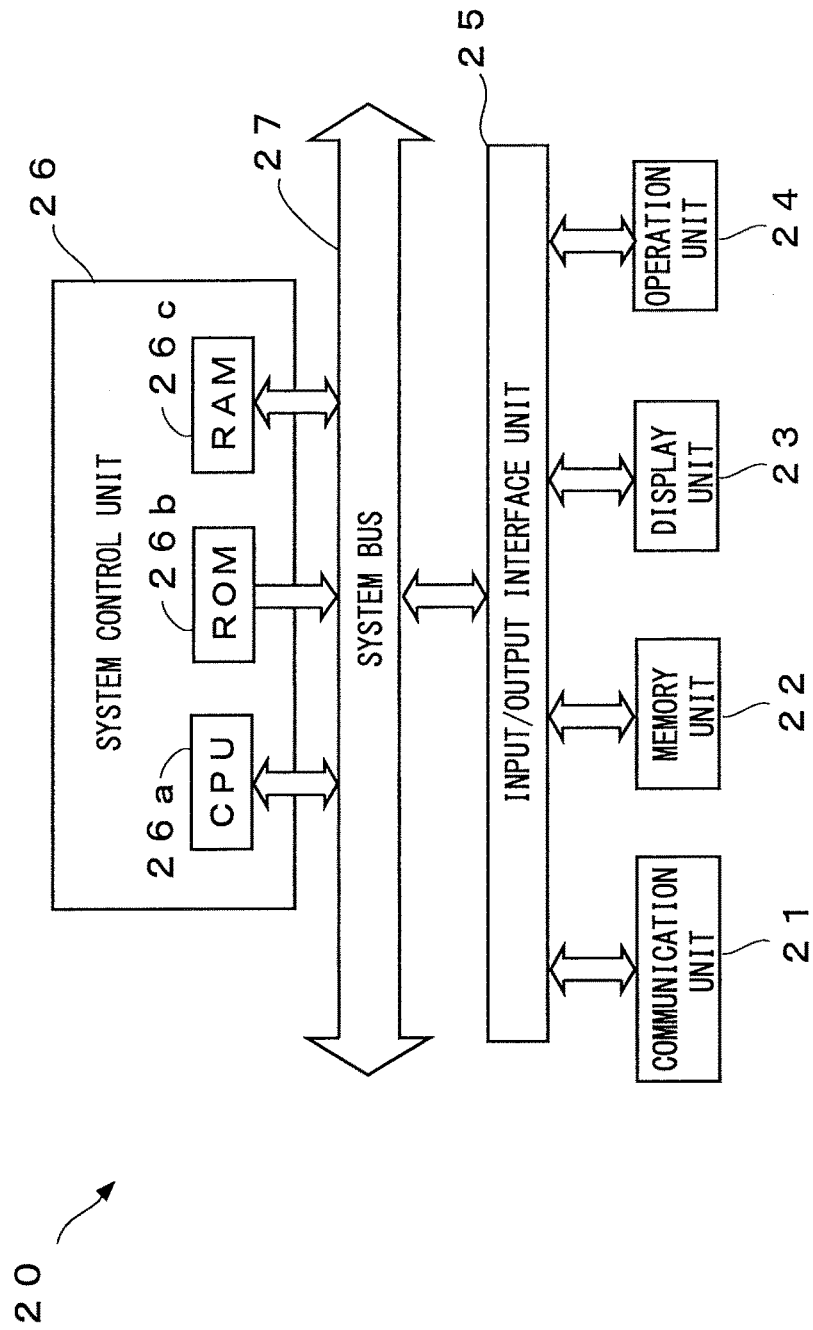
FIG. 3 illustrates a block diagram that illustrates an example of a schematic configuration of a user terminal in FIG. 1.

FIG. 3 illustrates a block diagram that illustrates an example of a schematic configuration of the user terminal 20.

As illustrated in FIG. 3, the user terminal 20 which functions as a computer has a communication unit 21, a memory unit 22 which is an example of the product storage means and the product image storage means, a display unit 23, an operation unit 24, an input/output interface unit 25 and a system control unit 26. Further, the system control unit 26 and the input/output interface unit 25 are connected through a system bus 27.

The communication unit 21 controls, for example, a communication state with, for example, the shopping server 10 through the network 3. In addition, when the user terminal 20 is a mobile wireless telephone, the communication unit 21 has a wireless communication function for connecting to a mobile communication network of the network 3.

The memory unit 22 has, for example, a hard disk drive, and stores, for example, an operating system and a web browser program.

The display unit 23 is formed with, for example, liquid crystal display elements or EL (Electro Luminescence) elements. The display unit 23 displays, for example, a web page which is acquired from the shopping server 10 and which includes a product image.

The operation unit 24 has, for example, a keyboard and a mouse. In addition, when the display unit 23 is a display panel of a touch switch type such as a touch panel, the operation unit 24 acquires information about a position on the display unit 23 which the user contacts or comes close to.

The input/output interface unit 25 performs interface processing between the communication unit 21 and the memory unit 22, and the system control unit 26.

The system control unit 26 has, for example, a CPU26*a*, a ROM 26*b* and a RAM 26*c* which is an example of the product storage means and the product image storage means. Further, when the CPU 26*a* reads and executes various programs stored in the ROM 26*b*, RAM 26*c* and the memory unit 22, or executes the acquired script, the system control unit 26 controls the display unit 23 to display a web page acquired from the shopping server 10, or changes, for example, a product image displayed on the web page.

(2.3 Configuration and Functions of Store Terminal 30)

Next, a configuration and functions of the store terminal 30 will be described using FIG. 4.

Figure 4:
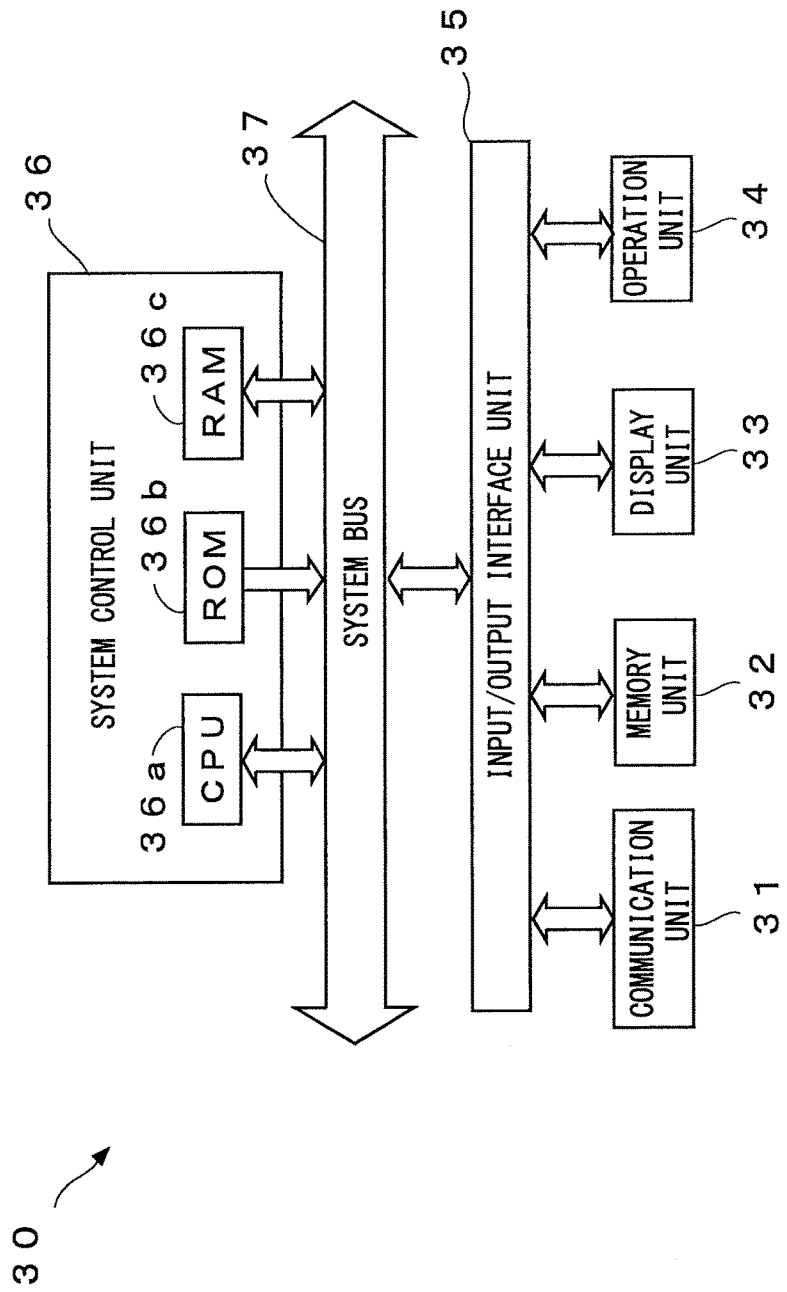
FIG. 4 illustrates a block diagram that illustrates an example of a schematic configuration of a store terminal in FIG. 1.

FIG. 4 illustrates a block diagram that illustrates an example of a schematic configuration of the store terminal 30.

As illustrated in FIG. 4, the store terminal 30 which functions as a computer has a communication unit 31, a memory unit 32 which is an example of the product storage means and the product image storage means, a display unit 33, an operation unit 34, an input/output interface unit 35 and a system control unit 36. Further, the system control unit 36 and the input/output interface unit 35 are connected through a system bus 37.

Each of the above units 31 to 36 has substantially the same configuration and function as each of the units 21 to 26 of the user terminal 20, thus description thereof will be omitted.

[3. Operation of Image Display System]

Next, an operation of the information processing system 1 according to the present embodiment will be described using FIGS. 5 to 11.

Figure 5:
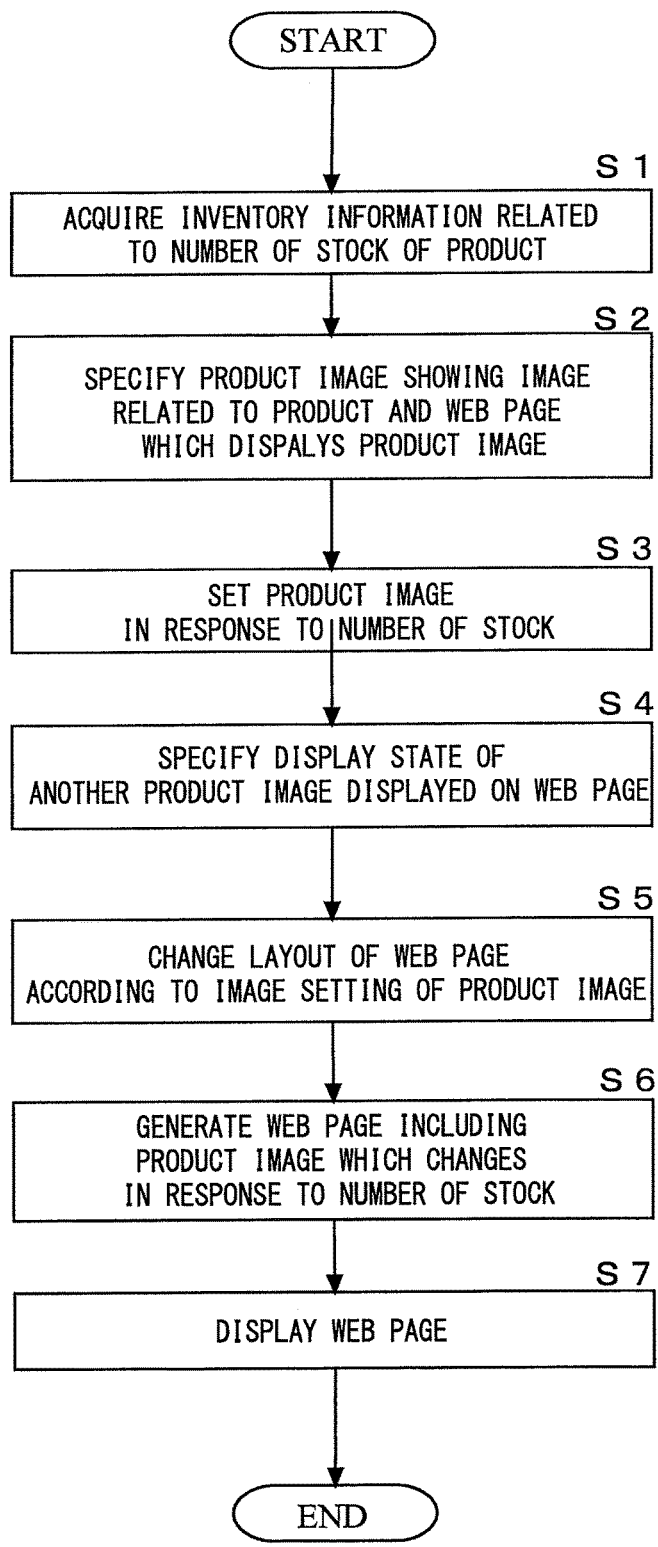
FIG. 5 illustrates a flowchart that illustrates an operation example of the image display system.

FIG. 5 illustrates a flowchart that illustrates an operation example of the image display system 1. FIGS. 6 to 11 are schematic diagrams that illustrate examples of web pages displayed on the user terminal 20 and the store terminal 30.

As illustrated in FIG. 5, the shopping server 10 acquires information related to a product and the number of stock (step S1). More specifically, the system control unit 14 of the shopping server 10 acquires a product ID and information related to the number of stock for a product in which number of stock changed. Still more specifically, inventory information related to an inventory is collected and calculated based on a product ID by the system control unit 14 of the shopping server 10 by acquiring, for example, supply information of a product from a store terminal and information that sales of a product is determined in the shopping server 10, and is stored in the product DB 12*a*. When the number of stock changes in this way, the system control unit 14 of the shopping server 10 functions as an example of an information acquiring means which acquires stock information related to the number of stock of a product to update a web page to a web page in response to the number of stock.

Figure 6:
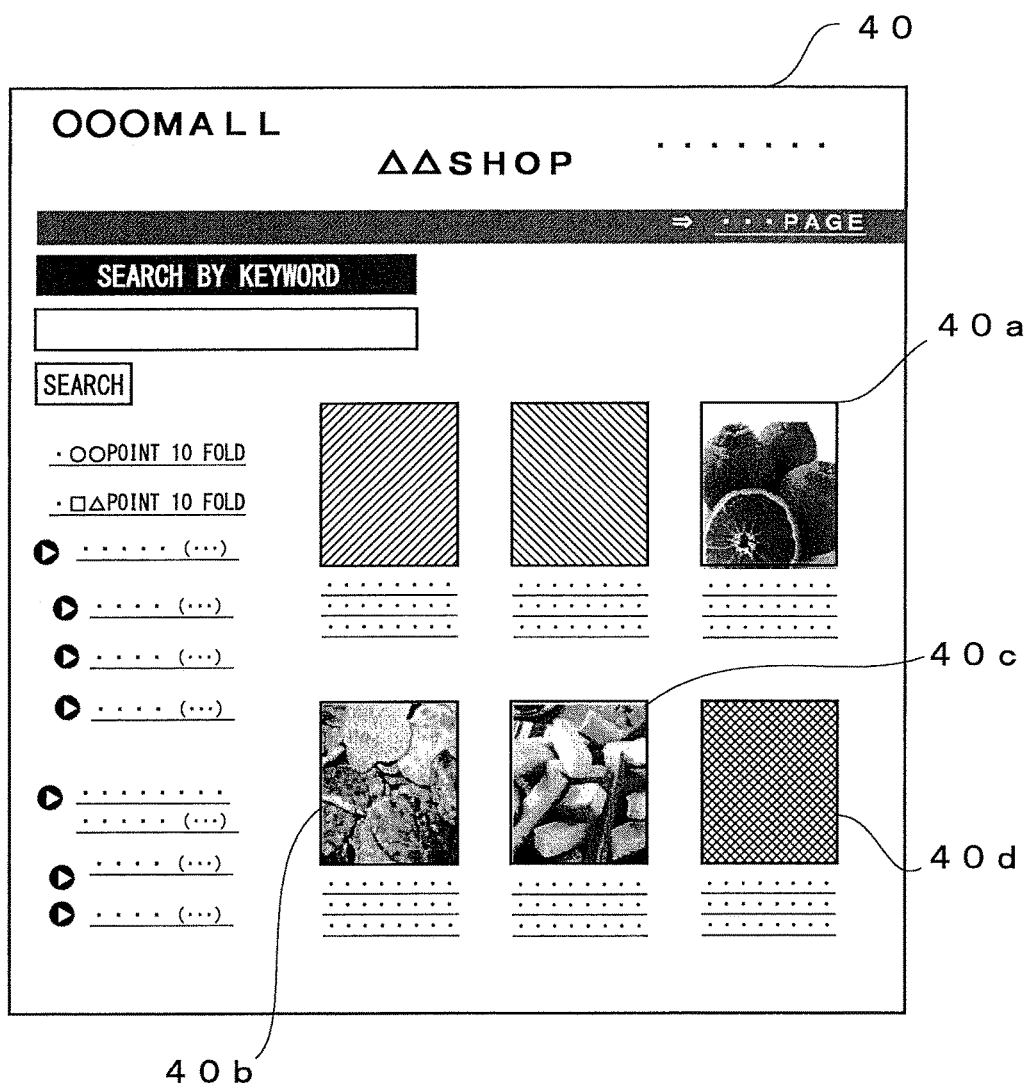
FIG. 6 illustrates a schematic diagram that illustrates an example of a web page displayed on a user terminal and a store terminal in FIG. 1.

Meanwhile, as illustrated in FIG. 6, a web page 40 is a web page of a store in a cybermall having a plurality of stores, and product images 40*a*, 40*b*, 40*c* and 40*d* displayed on a web page based on reference display are arranged. This reference display of a product image is image display showing the size of a certain image in the web page 40 or the brightness or the chroma of an image when the reference number of stock is set per product and the number of stock is the reference number of stock. The above reference number of stock refers to the number of potential sales for three days if, for example, a product is a hot-selling product and reference display in this case shows a product image in a state where the number of potential sales for three days is secured in stock. Meanwhile, when a product is not influenced by, for example, a season and is a hot-selling product all through a year, a product image in a state where the number of potential sales for one week is secured in stock is shown. Further, when the number of actually bought products or the number of purchasable products is used as the default number of stock, the default number of stock may be the reference number of stock. Furthermore, what inventory is secured depends on, for example, a sales strategy and, when, for example, a product is predictable, a small inventory may be secured, and, when a product is not predictable, a large inventory may be secured.

Thus, in response to a state of sales of, for example, a hot-selling product or in response to the number of stock such as the number of potential sales or the default number of stock of an individual product, reference display of a product image is approved. Further, according to, for example, a rank of the number of stock, a size of a product image in the above reference display is made small, a product image is made gradually thin or part of a product image is made defective.

In case that, for example, the number of potential sales for three days is the reference number of stock the above rank of the number of stocks is a "rank c" when the number of potential sales for one day is secured, is a "rank b" or a "rank a" when the number of secured stocks is for two days or three days and is a "rank d" when the stock runs out. Further, a product image is controlled according to the above rank. Specific processing will be described below. Thus, the system control unit 14 of the shopping server 10 functions as an example of a reference display approving means which approves reference display of a product image according to a product.

Next, the shopping server 10 specifies a product image showing an image related to a product and a web page which displays the product image (step S2). More specifically, the system control unit 14 of the shopping server 10 specifies the product image of the product image DB 12*c* and the web page of the product DB 12*a* based on a product ID. Further, the system control unit 14 of the shopping server 10 acquires the product image from the product image DB 12*c*, and acquires the web page from the product DB 12*a*.

Figure 7:
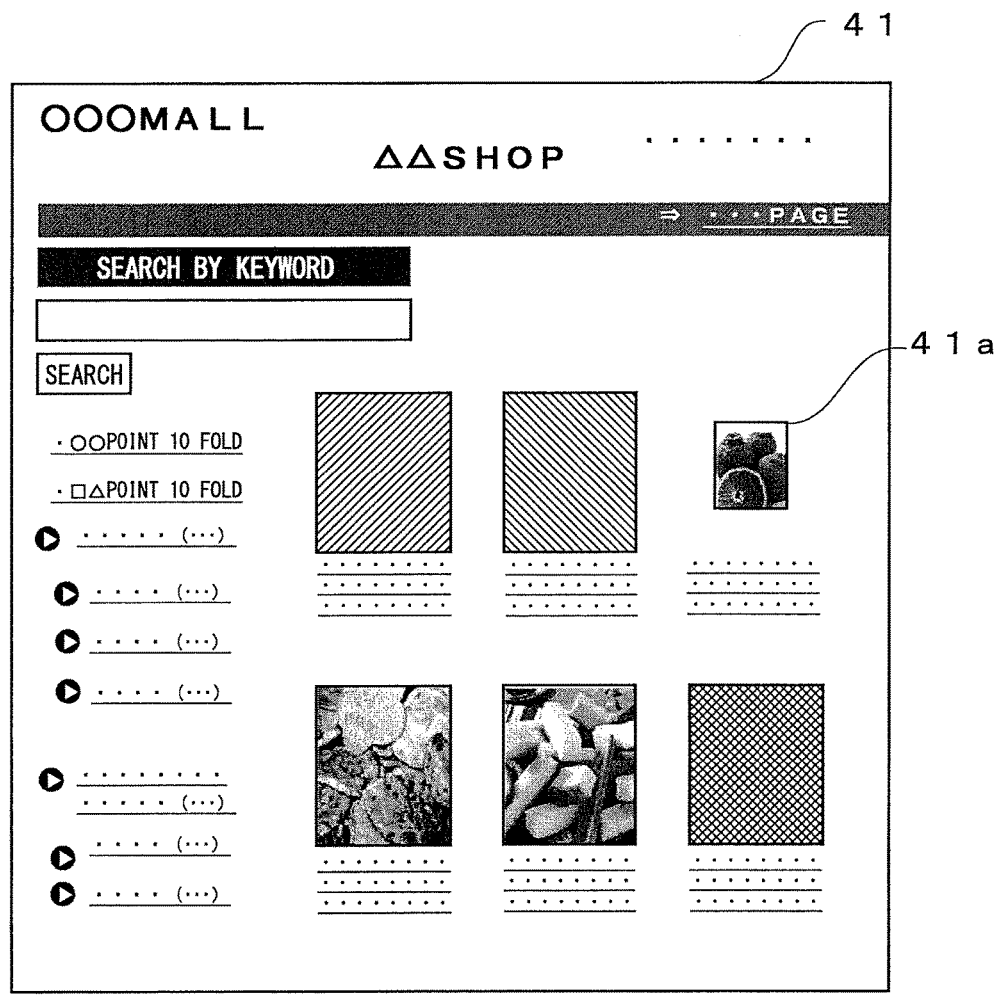
FIG. 7 illustrates a schematic diagram that illustrates an example of a web page displayed on the user terminal and the store terminal in FIG. 1.
Figure 8:
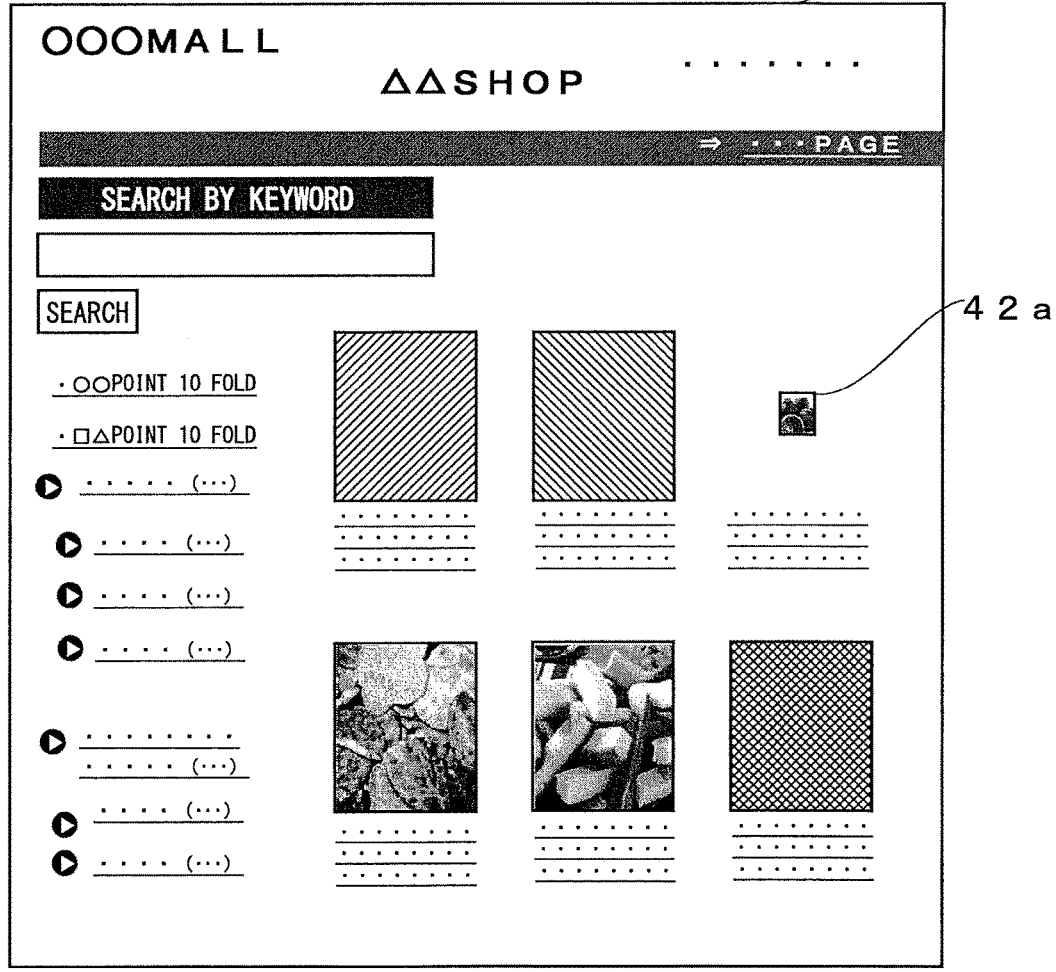
FIG. 8 illustrates a schematic diagram that illustrates an example of a web page displayed on the user terminal and the store terminal in FIG. 1.
Figure 9:
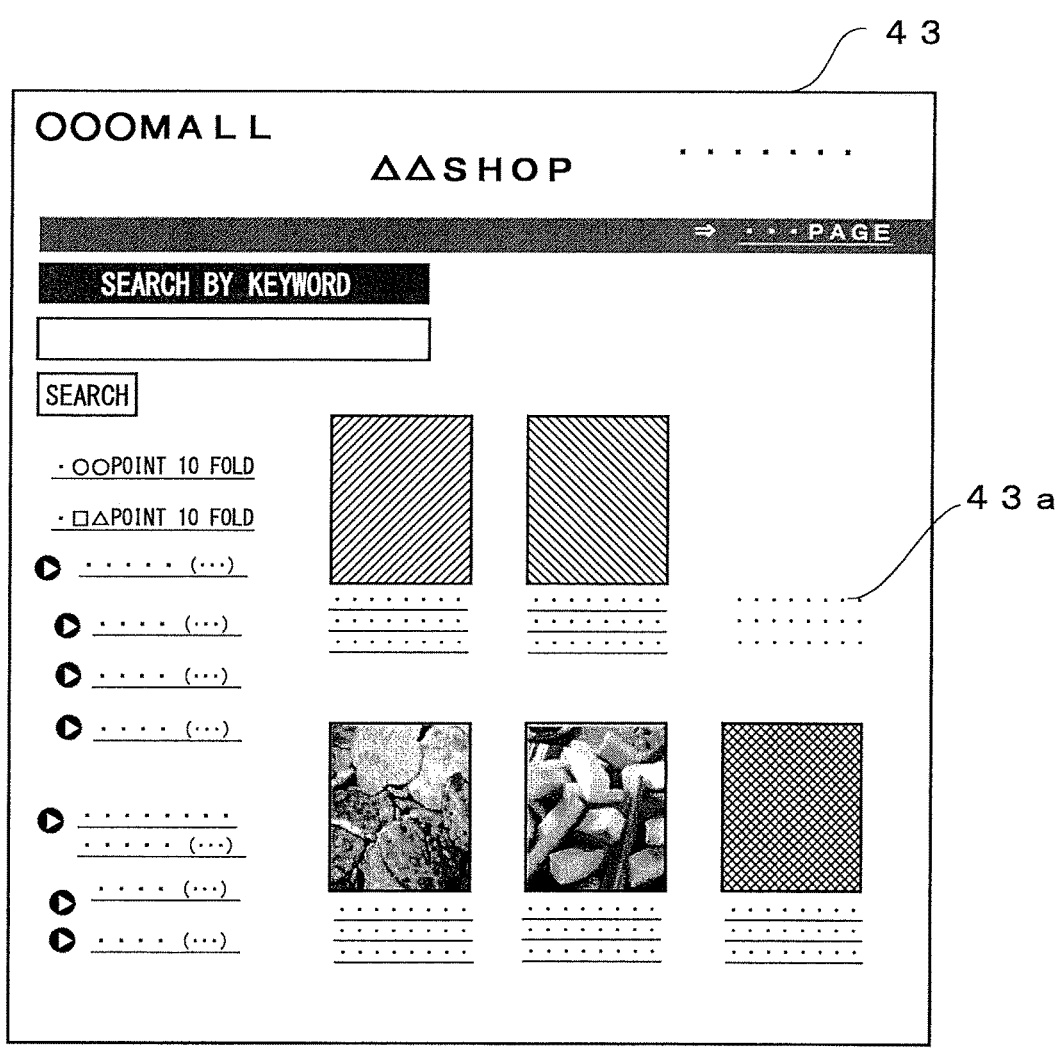
FIG. 9 illustrates a schematic diagram that illustrates an example of a web page displayed on the user terminal and the store terminal in FIG. 1.

Next, the shopping server 10 sets the product image in response to the number of stock (step S3). More specifically, the shopping server 10 controls display of the product image based on the number of stock in reference display of displaying on a web page the product image of setting the product image in response to the number of stock. Still more specifically, the system control unit 14 of the shopping server 10 acquires inventory information from the product storage means such as the product DB 12*a*, and acquires the product image from the product image storage means such as the product image DB 12*c*. Further, as illustrated in FIGS. 7 and 8, the system control unit 14 of the shopping server 10 reduces sizes of the product image 41*a*, the product image 42*a* and the product image in response to the number of stock. Furthermore, when the number of stock is zero or a predetermined number or less ("rank d"), the product image disappears as illustrated in FIG. 9, a link of product explanation display 43*a* also disappears and, even if the link is clicked, it is not possible to jump to a web page showing details of the product.

Thus, the system control unit 14 of the shopping server 10 functions as an example of the information acquiring means which acquires inventory information related to the number of stock of a product, from the product storage means which stores the stock information, and acquires the product image showing the image related to the product, from the product image storage means which stores the product image. Further, the system control unit 14 of the shopping server 10 functions as an example of a web page generating means which generates a web page for causing the product image which changes in response to the number of stock to be displayed on a terminal device. Furthermore, the system control unit 14 of the shopping server 10 functions as an example of an image setting means which sets the product image in response to the number of stock. Still further, the system control unit 14 of the shopping server 10 functions as an example of an image setting means which sets the size of the product image in response to the number of stock. Moreover, the system control unit 14 of the shopping server 10 functions as an example of an image display setting means which sets display of the product image from reference display in response to the number of stock when the product image is displayed on the web page.

Next, the shopping server 10 specifies a display state of another product image displayed on the web page (step S4). More specifically, as illustrated in FIG. 10, the system control unit 14 of the shopping server 10 specifies display states of, for example, product images 45*b*, 45*c* and 45*d* of products (for example, sizes of product images) other than a product image 45*a* in the same web page 45, and specifies the number of stock of the product other than the product image 45*a*.

Figure 11:
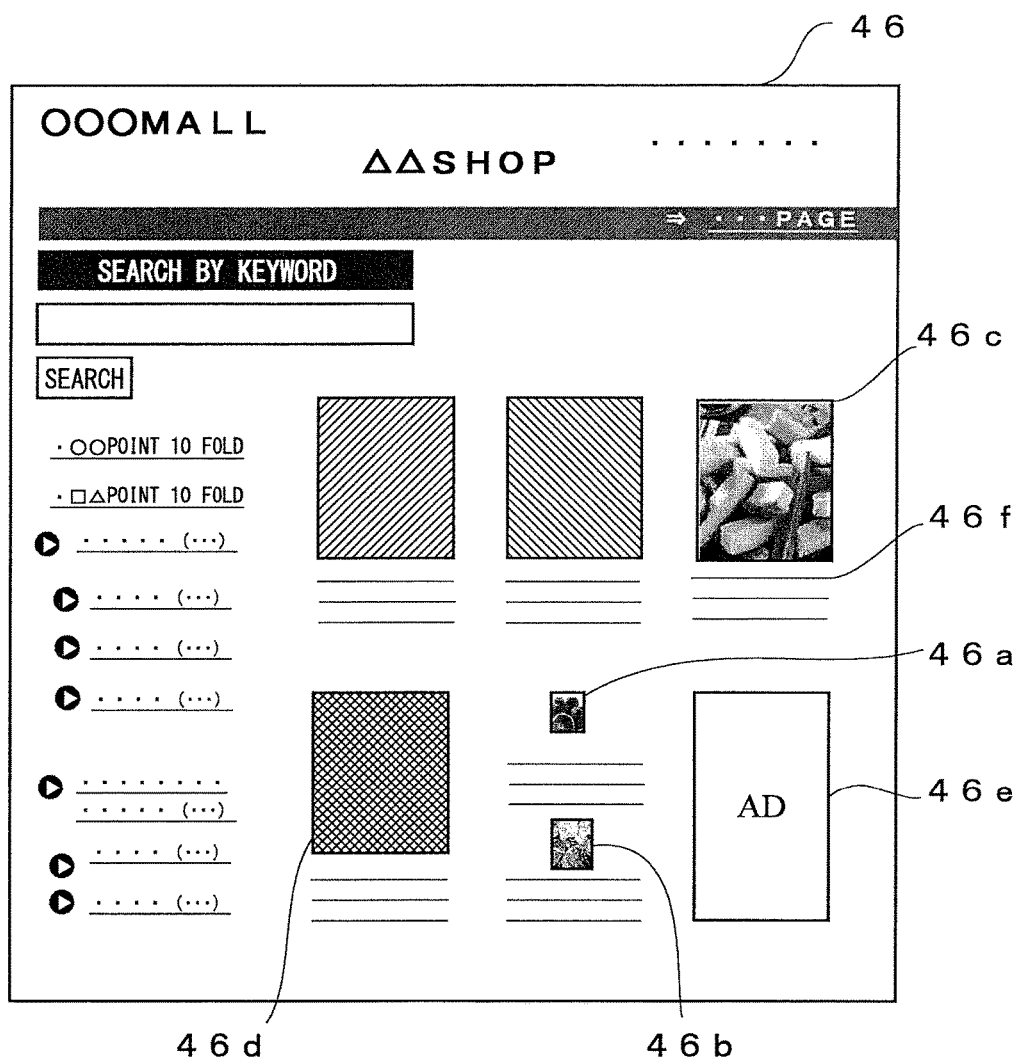
FIG. 11 illustrates a schematic diagram that illustrates an example of a web page displayed on the user terminal and the store terminal in FIG. 1.

Next, the shopping server 10 changes a layout of the web page according to an image setting of the product image (step S5). More specifically, the shopping server 10 changes the layout of the web page when a display control amount of the product image is a predetermined amount or more. As illustrated in FIG. 11, when, for example, the change amount of the size of the product image 46*a* which is an example of the display control amount of the product image is a predetermined amount or more compared to the product image 40*a* in reference display, the system control unit 14 of the shopping server 10 moves an arrangement of a product image 46*a* in a web page 46 downward and moves, for example, a product image 46*c* of a product which is sufficiently stocked upward in the web page 46. Meanwhile, the sufficient stock means a state where, for example, a stock rank is the "rank a".

Thus, when a product image of a product which is sufficiently stocked is arranged upward in the web page 46, for example, a product which is not sold well is arranged at a position at which the product gains user's attention, so that it is possible to, for example, recommend a product in which the number of stock is sufficient. Further, when the stock is cleared off, if a product image of a product in which the number of stock is not sufficient is arranged upward in the web page 46, the product in which the number of stock is not sufficient is arranged at a position at which the product gains user's attention, so that the shopping server 10 can promote the stock to be cleared off.

Figure 10:
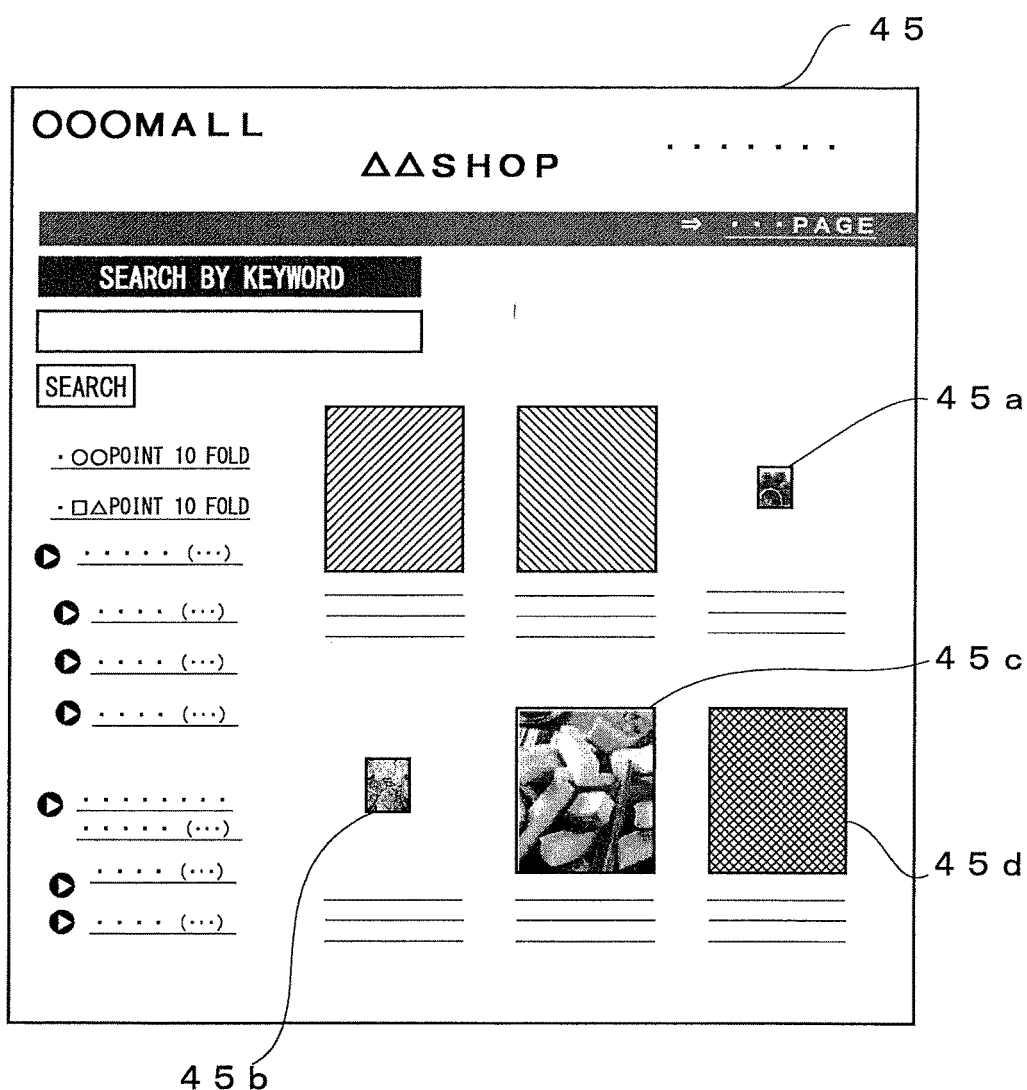
FIG. 10 illustrates a schematic diagram that illustrates an example of a web page displayed on the user terminal and the store terminal in FIG. 1.

Furthermore, in case of a product image 46*b* in a display state of another product image displayed on a specified web page, the system control unit 14 of the shopping server 10 may combine the product image 45*b* and the product image 45*a* in FIG. 10 to collectively display in a predetermined area which is an area which displays one product of the web page 46 similar to the product image 46*b* and the product image 46*a* in FIG. 11. By so doing, it is possible to effectively make the most of a limited screen area, and display a plurality of product images in an area which displays one product. Further, by collectively displaying a product in which the number of stock is small, the user can intuitively comprehend a group of products in which the number of stock is small at a glance. Furthermore, the products in which the number of stock is small are collectively displayed, so that the user can recognize a plurality of products in which the number of stock is small at a glance. In addition, a predetermined area which is an area which displays one product is, for example, an area which combines a product image 46*c* and a product explanation display 46*f*.

Further, the system control unit 14 of the shopping server 10 may change a layout such that an advertisement image 46*e* is displayed instead of an empty display frame or an erased product image. Thus, the system control unit 14 of the shopping server 10 functions as an example of a display position changing means which changes a display position of a product image on a web page in response to the number of stock. When the display control amount of a product image is a predetermined amount or more, display of the product image is set in response to the number of stock by changing the layout of a web page. Further, the system control unit 14 of the shopping server 10 functions as an example of the display position changing means which specifies a product image corresponding to the case that the number of stock is a predetermined number or less, and, when a plurality of product images are specified, changes display positions such that a plurality of product images are displayed in the predetermined area of the web page. Furthermore, the system control unit 14 of the shopping server 10 functions as an example of the display position changing means which specifies a plurality of product images corresponding to the case that the number of stock is a predetermined number or less, and changes display positions such that a plurality of specified product images are collectively displayed in a predetermined area of a web page.

Next, the shopping server 10 generates the web page including the product image which changes in response to the number of stock (step S6). More specifically, the system control unit 14 of the shopping server 10 generates web pages such as the web pages 40, 41, 42, 43, 44, 45 and 46 in which product images displayed in a controlled manner are embedded using, for example, a markup language such as HTML according to the changed layout of the web page. In this case, the system control unit 14 of the shopping server 10 rewrites a storage position and a file name of a product image such as an image tag in the web page of the product DB 12*a*, acquires a product image showing an image related to the product from the product image DB 12*c*, and replaces the product image of the web page in the product DB 12*a*.

Thus, the system control unit 14 of the shopping server 10 functions as an example of a generating means which generates a web page including the controlled product image. Further, the system control unit 14 of the shopping server 10 functions as an example of the information acquiring means which acquires information related to the number of stock of a product and acquires a product image showing an image related to the product.

Next, the web page is displayed (step S7). More specifically, when receiving a request for browsing a web page which displays a product image in response to the number of stock, that is, when receiving a request for displaying inventory information, from the user terminal 20 or the store terminal 30, the system control unit 14 of the shopping server 10 acquires a product image showing an image related to a product from the product image DB 12*c*, and transmits the product image to the user terminal 20 or the store terminal 30. Further, the system control unit 26 of the user terminal 20 and the system control unit 36 of the sore terminal 30 which have received the web page display the web page on the display unit 23 and the display unit 33, respectively.

Thus, the system control unit 14 of the shopping server 10 functions as an example of a transmitting means which transmits the web page to the terminal device. Further, the system control unit 14 of the shopping server 10 functions as an example of a display means which generates and transmits a web page displayed on display devices to the user terminal 20 and the store terminal 30 which have the display devices to display the generated web page on the display devices. Furthermore, the system control unit 26 of the user terminal 20 and the system control unit 36 of the store terminal 30 function as an example of the display means which causes the web page to be displayed on the display device by causing the received web page to be displayed on the display units 23 and 33, respectively.

As described above, according to the present embodiment, by acquiring inventory information related to the number of stock of a product, from a product storage means (product DB 12*a*) which stores the inventory information, acquiring the product image showing the image related to the product from the product image storage means (product image DB 12*c*) which stores the product image, and displaying the product image which changes in response to the number of stock, on the web pages 40 to 46 of the user terminal 20 and the store terminal 30, the inventory information and a change of the inventory information are accurately visualized, so that a store side which supplies product and users who purchase products can accurately comprehend the number of stock and share a situation in which the number of stock is updated. Further, for example, the size of each product image is standardized as in the web page 40 in FIG. 6, so that the change of the number of stock of a product is more easily comprehend at a glance, and the store side which supplies products and users who purchase products can share the situation in which the number of stock are updated.

Further, by acquiring information related to the number of stock of a product and a product image showing an image related to the product, approving reference display of the product image according to the product, controlling display of the product image from reference display based on the number of stock when the product image is displayed on a web page, generating the web pages 40 to 46 including the controlled images, and displaying the generated web pages 40 to 46 on the display units 23 and 33, a change in the number of stock of the product is easily comprehended based on a difference between the displayed product image and reference display, so that the store side which supplies products and users who purchase products can share the situation in which the number of stock is updated while accurately comprehending the inventory.

When a product image is set in response to the number of stock, by setting a product image displayed on a web page by, for example, processing the product image in response to the number of stock or acquiring the product image processed in response to the number of stock, it is possible to provide the product image in response to the number of stock for the store side which supplies products and users who purchase products.

Further, when the size of the product image is set in response to the number of stock, the number of stock is more easily recognized visually based on the size of the product image such as the product images 40*a*, 41*a* and 42*a*.

Furthermore, as an example of an alternative display means, when the number of stock is a predetermined number or less, by displaying a product image of another product such as a product image of a new product, a product image which collects products of which the number of stock is large and products of which the number of stock is similar, more useful information is presented to users. Still further, based on the change of a display position of a product image on a web page, the number of stock is more easily recognized.

Moreover, when the number of stock is a predetermined number or less, if the advertisement image 46*e* related to another product is alternatively displayed, more useful information is presented to users.

Further, when the product images 45*a* and 45*b* corresponding to the case that the number of stock is predetermined number or less are specified, and the layout of the web page 45 is changed using a plurality of specified product images 45*a* and 45*b*, product images (product images 46*a* and 46*b*) of products of which the number of stock is similar as in the web page 46 are collected, and a display position of a product image in the web page is changed, so that more useful information is presented to users and the number of stock is more easily recognized.

Furthermore, when the number of stock is a predetermined number or less, if the display position of a product image in the web page 45 is changed, product images of products in which the number of stock is similar are collected and display positions of the product images 46a and 46b in the web page 46 are changed to less distinctive positions, so that more useful information is presented to users and the number of stock is more easily recognized.

Further, when the display position of a product image is changed, if the product image 46c of the product in which the number of stock is a predetermined number or more is arranged, more useful information is presented to users, and the store side can promote purchase of a product which is abundantly stocked.

Figure 12:
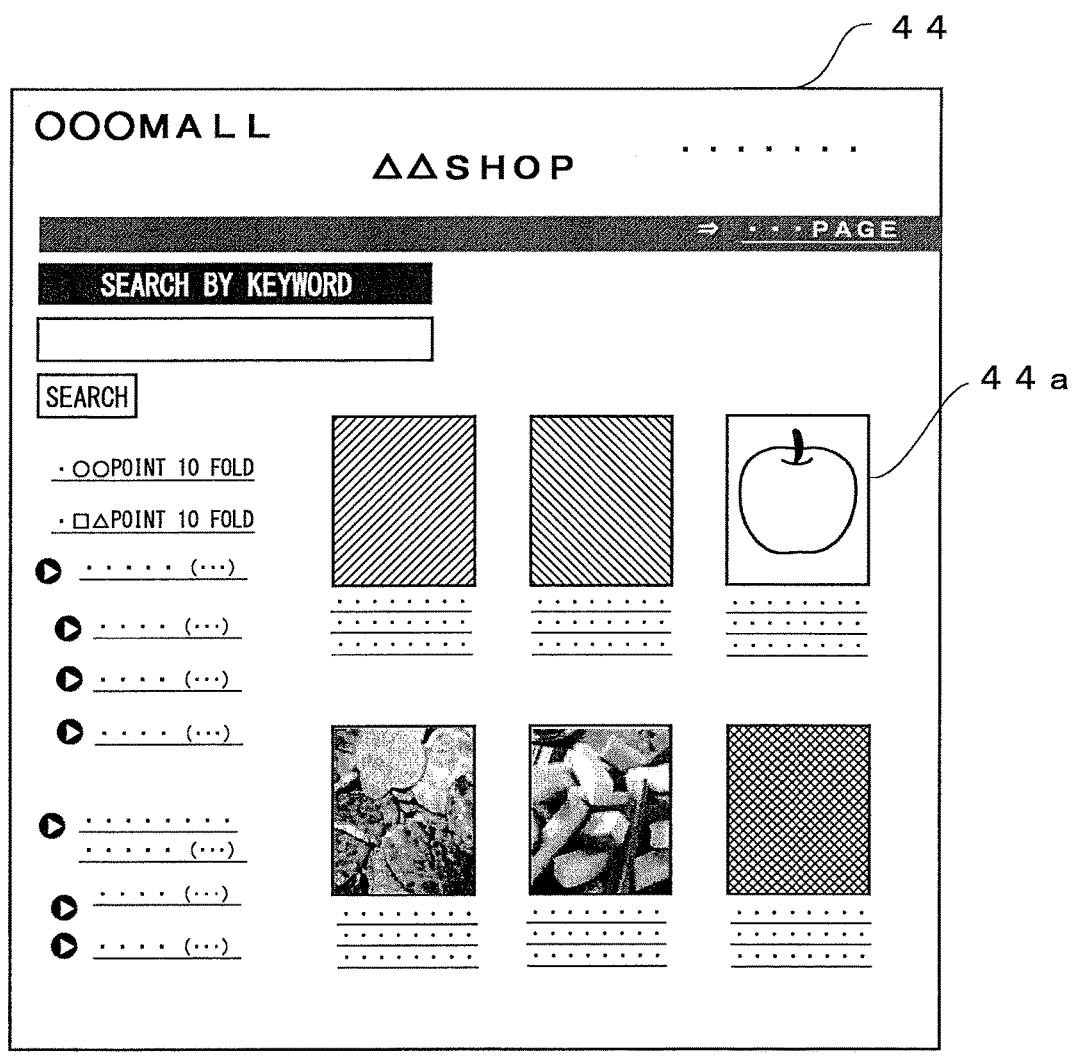
FIG. 12 illustrates a schematic diagram that illustrates an example of a web page displayed on the user terminal and the store terminal in FIG. 1.

In addition, as illustrated in FIG. 9, when the number of stock is a predetermined number or less and a product image disappears, as illustrated in FIG. 12, the system control unit 14 of the shopping server 10 may cause a product image 44a of a new product to be displayed instead of an empty display frame or an erased product image. The system control unit 14 of the shopping server 10 displays a product image of a product belonging to the same category as the same type of the product as the product of which the number of stock is a predetermined number or less. Meanwhile, the product image 44a is a product image of a product image belonging to the same category of a fruit.

Further, when the number of stock becomes a predetermined number or less and a product image disappears, the system control unit 14 of the shopping server 10 may set the priority of a product image presented alternatively. For example, the priority refers to an order of hot-selling products or an order of the greater number of stock. Further, the priority may be set per category. For example, the priority in case of a category of food, and the priority in case of a category of a fashion are set. Further, the store side may purchase a display frame of a product image on a web page, and set the priority of the product presented in this display frame.

Next, a first modified example of a product image displayed on the user terminal and the store terminal will be described using FIGS. 13 and 14.

Figure 13:
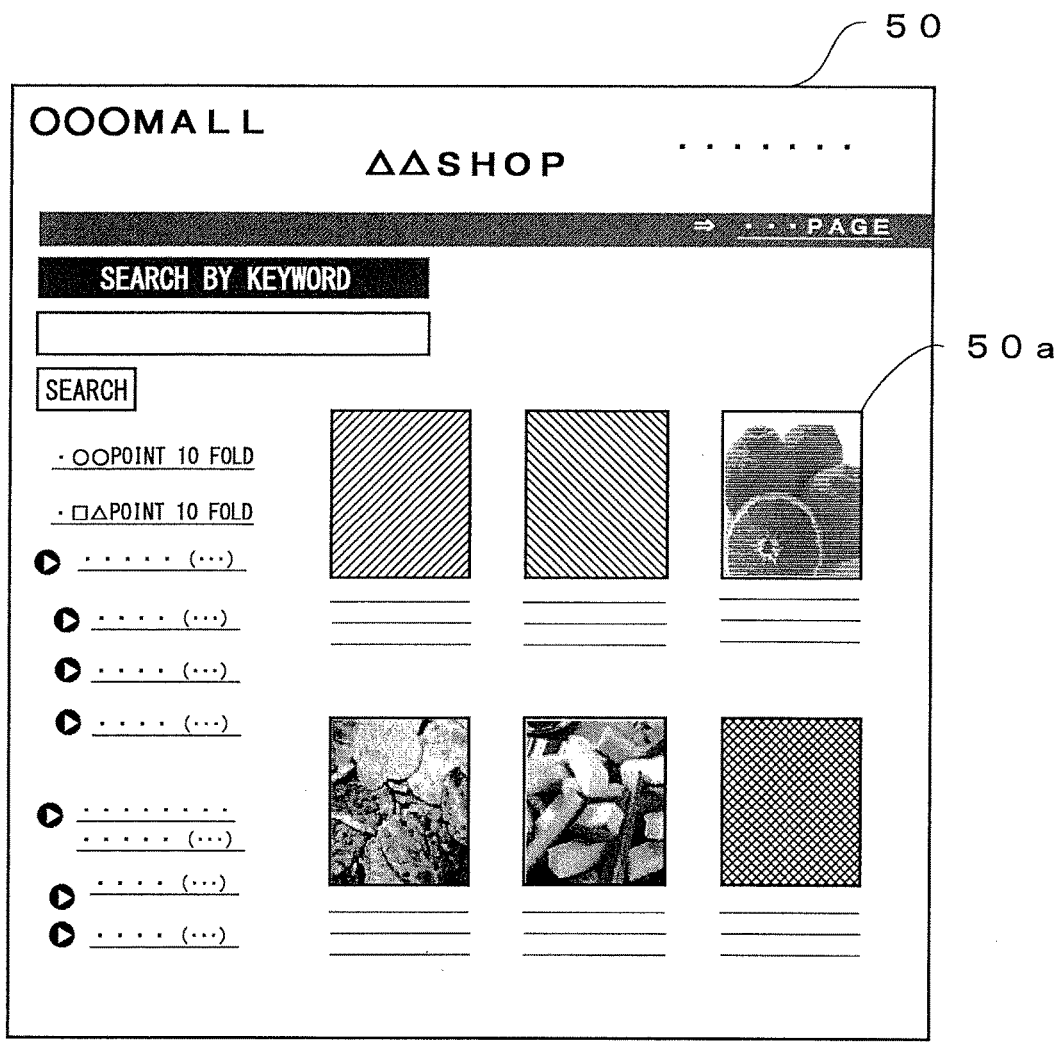
FIG. 13 illustrates a schematic diagram that illustrates a first modified example of a product image displayed on the user terminal and the store terminal in FIG. 1.

FIG. 13 illustrates a schematic diagram that illustrates the first modified example of the product image displayed on the user terminal 20 and the store terminal 30. FIG. 14 illustrates a schematic diagram that illustrates a change of a product image.

As illustrated in FIG. 13, a product image 50a displayed in a web page 50 is a product image in which pixel information of the product image 40a displayed in the web page 50 in FIG. 6 is controlled based on the number of stock. More specifically, alpha components are set in addition to RGB components as pixel information of the product image 50a, and an alpha value decreases as the number of stock decreases and a product image becomes transparent. Further, when the number of stock becomes further smaller compared to the product image 50a, the product image 50a becomes like a product image 51a displayed in a web page 51 as illustrated in FIG. 14, and, if the stock runs out, the alpha value finally becomes zero and a product image becomes transparent and invisible.

When pixel information of a product image is controlled in response to the number of stock, a product image becomes dark or transparent in response to the number of stock, so that the number of stock is more easily recognized visually.

Thus, the system control unit 26 of the user terminal 30 and the system control unit 36 of the store terminal 30 function as an example of the image display setting means which sets pixel information of a product image in response to the number of stock. Further, the system control unit 14 of the shopping server 10 functions an example of the image display setting means which generates and transmits a web page displayed on display devices to the user terminal 20 and the store terminal 30 which have the display devices to set pixel information of the product image in response to the number of stock.

Next, a second modified example of a product image displayed on the user terminal and the store terminal will be described using FIG. 15.

FIG. 15 illustrates a schematic diagram that illustrates the second modified example of the product image displayed on the user terminal 20 and the store terminal 30.

Figure 15A:
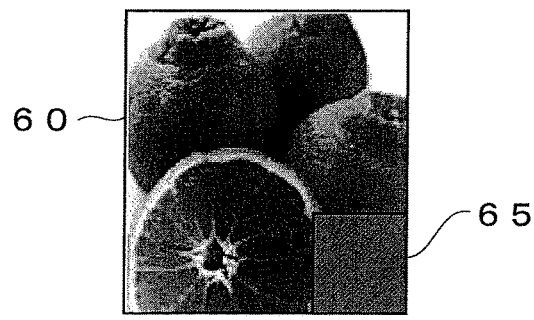
FIG. 15 illustrates a schematic diagram that illustrates a second modified example of a product image displayed on the user terminal and the store terminal in FIG. 1.
Figure 15B:
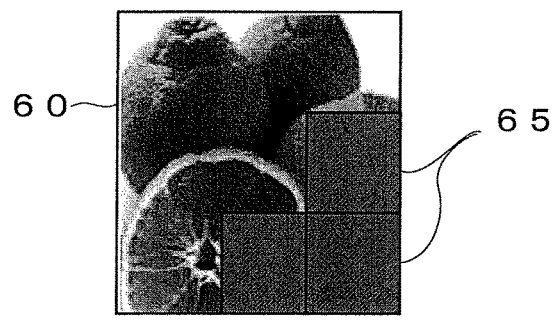
Figure 15C:
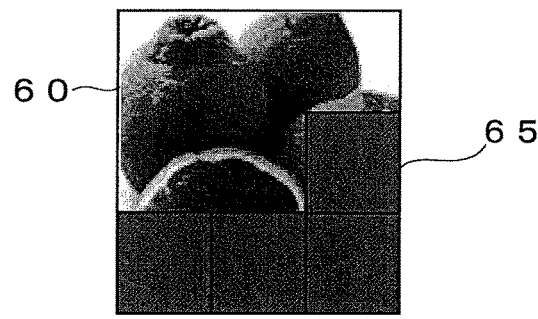
Figure 15D:
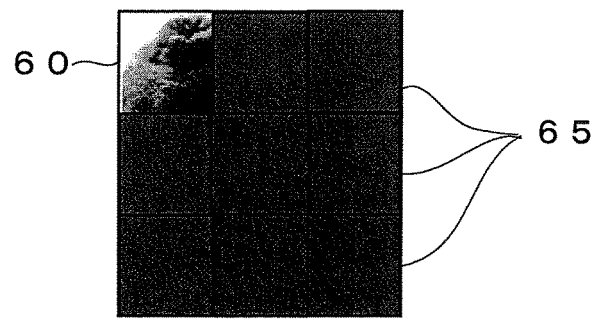
Figure 16A:
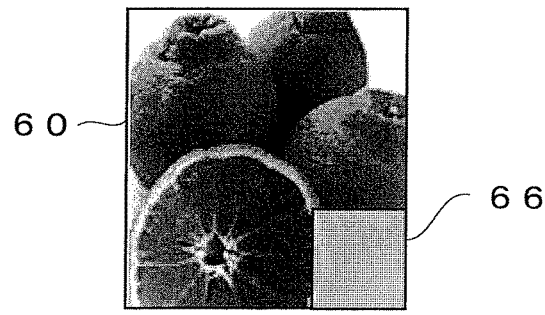
FIG. 16 illustrates a schematic diagram that illustrates a third modified example of a product image displayed on the user terminal and the store terminal in FIG. 1.
Figure 16B:
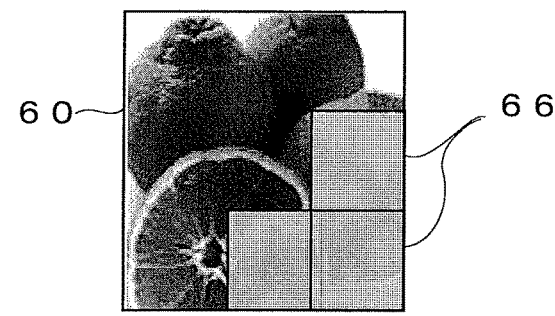
Figure 16C:
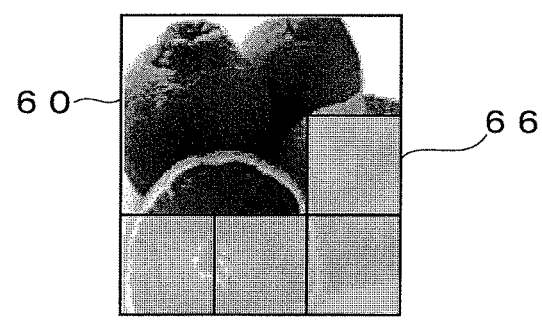
Figure 16D:
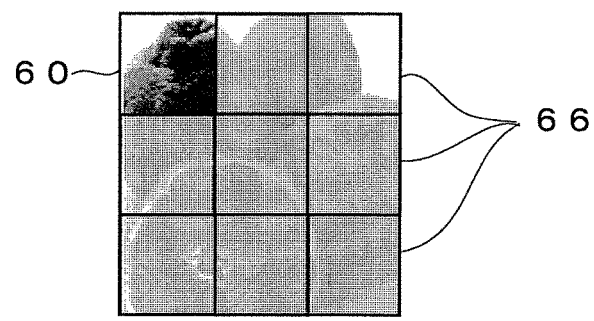
Figure 17A:
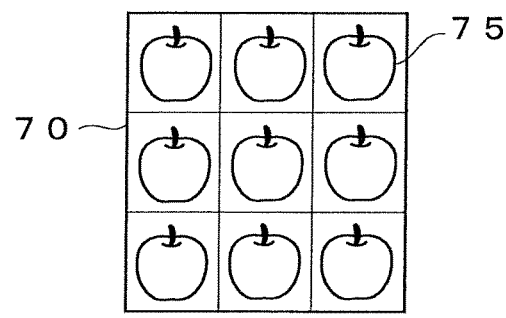
FIG. 17 illustrates a schematic diagram that illustrates a fourth modified example of a product image displayed on the user terminal and the store terminal in FIG. 1.
Figure 17B:
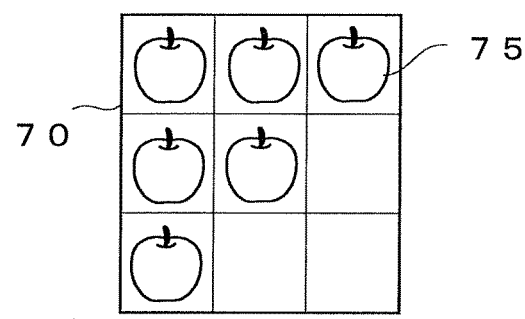
Figure 17C:
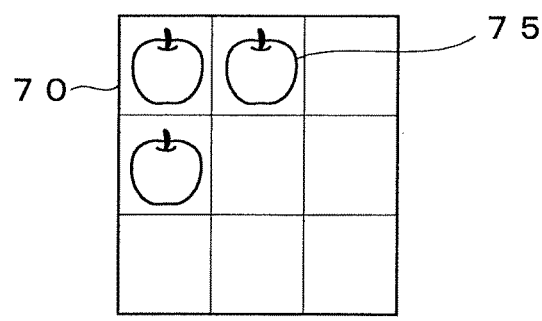
Figure 17D:
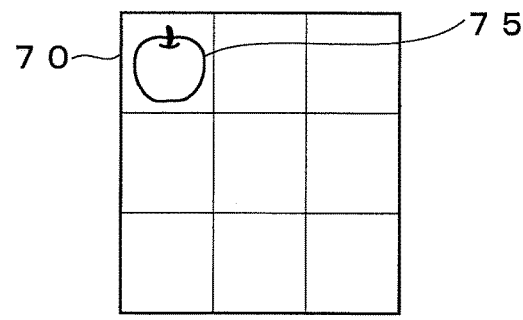

As illustrated in FIG. 15A, a mask image (an example of a product image different from a product image) 65 covers part of a product image 60. When the number of stock decreases, the mask image 65 covering the product image 60 increases as illustrated in FIGS. 15B, 15C and 15D, and, when the stock runs out, the product image 60 is completely covered by the mask image 65. When the mask image 65 which is an example of a product image different from a product image overlaps part of the product image in response to the number of stock, the number of stock is more easily recognized visually.

Next, a third modified example of a product image displayed on the user terminal and the store terminal will be descried using FIG. 16.

FIG. 16 illustrates a schematic diagram that illustrates the third modified example of the product image displayed on the user terminal 20 and the store terminal 30.

As illustrated in FIG. 16, instead of the mask image 65 in FIG. 15, a semi-transparent mask image 66 which allows the product image 60 to pass is used. When the number of stock decreases, a mask image 66 covering the product image 60 increases as illustrated in FIGS. 16A, 16B, 16C and 16D, and, when the stock runs out, the product image 60 is completely covered by the mask image 66. When the mask image 66 which is an example of a product image different from the product image overlaps part of the product image 60 based on the number of stock, the number of stock is more easily recognized visually. Further, the mask image 66 is semi-transparent, so that which product is displayed in the product image 60 is more easily recognized.

Thus, the system control unit 26 of the user terminal 20 and the system control unit 36 of the store terminal 30 function as an example of the image display setting means which sets display of a product image in response to the number of stock in reference display of displaying a product image on a web page, and functions as an example of the image display setting means which overlaps on part of a product image a product image different from the product image. Further, the system control unit 14 of the shopping server 10 functions as an example of the image display setting means which generates a web page displayed on display devices and transmits the web page to the user terminal 20 and the store terminal 30 which have the display devices to overlap on part of a product image a product image different from the product image in response to the number of stock.

Next, a fourth modified example of a product image displayed on the user terminal and the store terminal will be described using FIG. 17.

FIG. 17 illustrates a schematic diagram that illustrates the fourth modified example of the product image displayed on the user terminal and the store terminal.

As illustrated in FIG. 17, the number of images 75 imitating products may change in response to the number of stock. As illustrated in FIG. 17A, when the number of stock is a predetermined number or more, the image 75 imitating a product is displayed on an entire display area of a product image 70. When the number of stock decreases, the image 75 of the product image 70 decreases as illustrated in FIGS. 17B, 17C and 17D, and, when the stock runs out, the image 75 disappears from the display area of the product image 70 and another product image and an advertisement image are displayed. By changing the number of images 75 imitating products in response to the number of stock in this way, the number of stock is more easily recognized visually.

Figure 14:
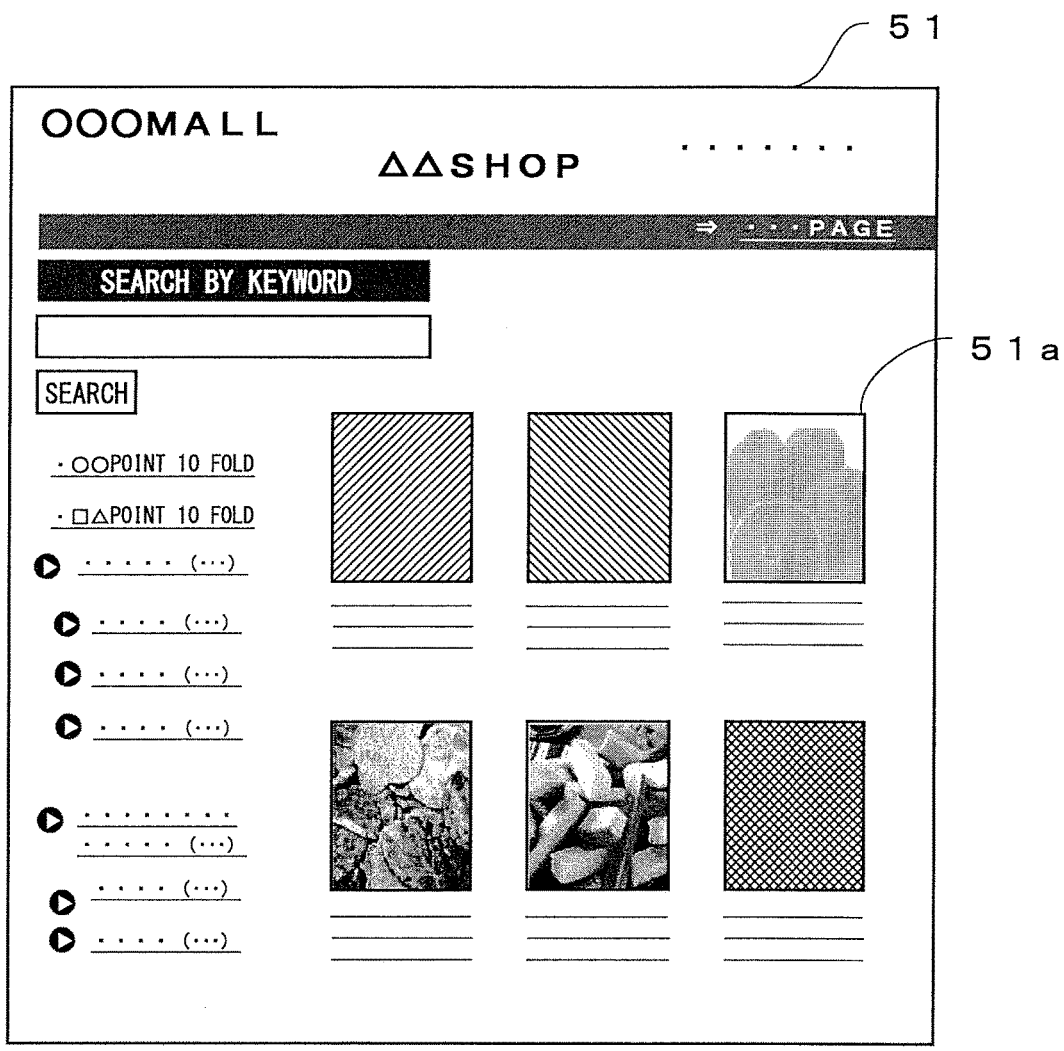
FIG. 14 illustrates a schematic diagram that illustrates a change of a product image.

In addition, when display positions of the product images 45a and 45b in the web page in FIG. 10, and display positions of the product images 50a and 51a in the web pages 50 and 51 in FIGS. 13 and 14 and the product images 60 and 61 in FIGS. 15 and 16 are changed according to an image setting of product images as an example of display position change, products having similar display control amounts of the product images are collected, or the display positions of the product images in the web pages change, so that more useful information is presented to users, and the number of stock is more easily recognized.

The system control unit 14 of the shopping server 10 may process, change and set a product image in response to the number of stock when receiving a request for displaying inventory information. Further, the system control unit 14 of the shopping server 10 may generate in advance a web page in which a product image is set in response to the number of stock per predetermined period, store the web page in, for example, the product image DB 12c and, when receiving a request, transmit the web page to the user terminal 20 and the store terminal 30. Furthermore, the system control unit 14 of the shopping server 10 may generate in advance a plurality of web pages in which a product image is set in response to the number of stock and store the web pages in, for example, the product image DB 12c and, when receiving a request, select the web pages in response to the number of stock and transmit the web pages to the user terminal 20 and the store terminal 30. Thus, a product image in response to the number of stock only needs to be provided when the product image is displayed.

Figure 18:
FIG. 18 illustrates a schematic diagram that illustrates a table of inventory information and product images stored in the user terminal and the store terminal.
Figure 18:
Figure 18:

The terminal device may acquire inventory information related to the number of stock of a product from the product storage device (product DB 12a) which stores the inventory information through the network 3, acquire the product image showing an image related to the product from the product image storage device (product image DB 12c) which stores the product image through the network and acquire the inventory information from the product storage device (product DB 12a) at a predetermined time interval. As illustrated in FIG. 18, the correspondence between the number of stock and product images includes, for example, that a product image has the number of stock of a product between 1 to 9, the product image 42a has the number of stock of a product between 10 to 99, the product image 41a has the number of stock of a product between 100 and 999, and the product image 40a has the number of stock of a product between 1000 and 9999. The system control unit 26 (36) of the terminal device sends an inquiry to the shopping server 10, and acquires a database of a table showing this correspondence between the number of stock and product images. Further, the system control unit 26 (36) of the terminal device stores the acquired database in the memory unit 22 (memory unit 23).

Subsequently, the system control unit 26 (36) of the terminal device inquires about inventory information of a product to the shopping server 10 at, for example, intervals of one minute to ten minutes. Further, the system control unit 26 (36) of the terminal device acquires the number of stock "1001" at a point of inquiry time T1, refers to the database stored in advance, acquires the product image 40a and displays the product image 40a on the display unit 23 (33). Subsequently, at a point of time T2 one minute after the point of time T1, the system control unit 26 (36) of the terminal device transmits a request for acquiring the number of stock to the shopping server 10 to inquire about inventory information of a product. Further, the system control unit 26 (36) acquires the number of stock "998" of a product at the point of inquiry time T2, refers to the database stored in advance, acquires the product image 41a and displays the product image 41a on the display unit 23 (33). Subsequently, the system control unit 26 (36) of the terminal device acquires the number of stock at a point of time T3 or a point of time T4 several minutes after the point of time T2, acquires the number of stock and refers to, acquires and displays a product image from the database based on the acquired number of stock. Thus, it is possible to reflect inventory information in the product image in real time by updating the product image as the time passes.

Further, the system control unit 26 of the user terminal 20 and the system control unit 36 of the store terminal 30 may acquire information of the number of stock from the shopping server 10 according to, for example, a script of a web page, acquire a product image from the shopping server 10 based on the acquired number of stock, set display of the product image according the number of stock, change a display mode such as the size and the degree of transparency of the product image displayed on the web page, and change the web page including the product image to generate the web page displayed on the display units 23 and 33 by analyzing, for example, the markup language and actually display the web page on the display units 23 and 33.

Thus, the system control unit 14 of the shopping server 10, the system control unit 26 of the user terminal 20 and the system control unit 36 of the store terminal 30 function as an example of the information acquiring means which acquires information related to the number of stock of a product and a product image showing an image related to the product, functions as an example of the generating means which generates a web page including the controlled product image, and functions as an example of the display means which causes the web page to be displayed on a display device.

In addition, the predetermined number in the number of stock may be set by a store side which supplies products or an advertiser, or may be set by a shopping server side which runs a shopping site.

In addition, the product DB 12a which is an example of the product storage means which stores inventory information illustrated in FIG. 2 and the product image DB 12c which is an example of the product image storage means which stores product images may be provided in the same database. Further, the product storage means and the product image storage means may belong to different servers.

Furthermore, the present invention is by no means limited to the above example. The above embodiment is an exemplary embodiment, and employs the substantially same configuration as a technical idea recited in the claims of the present invention, and all inventions having the same function and effect are incorporated within the technical scope of the present invention.

EXPLANATION OF REFERENCE NUMERALS

3: NETWORK
10: SHOPPING SERVER (INFORMATION PROCESSING DEVICE)
  11: COMMUNICATION UNIT
  12: MEMORY UNIT
  12a: PRODUCT DB
  12b: MEMBER DB
  12c: PRODUCT IMAGE DB
  14: SYSTEM CONTROL UNIT
20: USER TERMINAL (TERMINAL DEVICE AND INFORMATION PROCESSING DEVICE)
  21: COMMUNICATION UNIT
  23: DISPLAY UNIT
  24: OPERATION UNIT
  26: SYSTEM CONTROL UNIT
30: STORE TERMINAL (TERMINAL DEVICE AND INFORMATION PROCESSING DEVICE)
  31: COMMUNICATION UNIT
  33: DISPLAY UNIT
  34: OPERATION UNIT
  36: SYSTEM CONTROL UNIT
40, 41, 42, 43, 45, 46, 50, 51: WEB PAGE
40a, 40b, 40c, 40d, 41a, 42a, 45a, 45b, 45c, 45d, 46a, 46b, 46c, 46d, 50a, 51a, 60: PRODUCT IMAGE
  46e: ADVERTISEMENT IMAGE
  65, 66: MASK IMAGE

The invention claimed is:

1. An information processing device comprising:
   at least one memory configured to store computer program code;
   at least one processor configured to access said memory, read said computer program code, and execute according to said computer program code,
   said computer program code comprising:
     information acquiring code configured to cause at least one of said at least one processor to:
       acquire inventory information related to a number of stock of a product from a product storage that stores the inventory information, and
       acquire a product image showing an image related to the product from a product image storage that stores the product image;
     web page generating code configured to cause at least one of said at least one processor to generate a web page for causing the product image to be displayed on a terminal device;
     transmitting code configured to cause at least one of said at least one processor to transmit the web page to the terminal device; and
     image setting code configured to cause at least one of said at least one processor to set a display control amount of a product image in response to the number of stock of the product, wherein,
   the product image changes gradually in response to a change in the number of stock of the product to visually indicate the number of stock of the product, while the stock of the product exists, and
   the information acquiring code is further configured to cause at least one of said at least one processor to acquire a table including product images in correspondence with respective number of stock, transmit the table to the terminal device in advance, and acquire the inventory information related to the number of stock through a network at a predetermined time interval.

2. The information processing device according to claim 1, wherein the image setting code is further configured to cause at least one of said at least one processor to set a size of the product image corresponding to the number of stock as the display control amount.

3. The information processing device according to claim 1, wherein the image setting code is further configured to cause at least one of said at least one processor to make a setting to overlap a mask image of a predetermined size on part of the product image based on the number of stock as the display control amount.

4. The information processing device according to claim 1, wherein the image setting code configured to cause at least one of said at least one processor to set pixel information of the product image based on the number of stock as the display control amount.

5. The information processing device according to claim 1, wherein the computer program code further comprises alternative display code configured to cause at least one of said at least one processor to, when the number of stock is a predetermined number or less, cause a product image of another product to be displayed instead of the product image.

6. The information processing device according to claim 5, wherein the alternative display code is further configured to cause at least one of said at least one processor to, when the number of stock is a predetermined number or less, cause an advertisement related to another product to be displayed alternatively.

7. The information processing device according to claim 1, wherein the computer program code further comprises display position changing code configured to cause at least one of said at least one processor to change a display position of the product image in the web page in response to the number of stock.

8. The information processing device according to claim 7,
   wherein the computer program code further comprises product image specifying code configured to cause at least one of said at least one processor to specify a product image corresponding to the case that the number of stock is a predetermined number or less, and
   wherein the display position changing code is further configured to cause at least one of said at least one processor to, when a plurality of product images are specified according to the product image specifying code, change display positions such that the plurality of product images are collectively displayed in a predetermined area of the web page.

9. The information processing device according to claim 7, wherein the display position changing code is further configured to cause at least one of said at least one processor to, when changing the display position of the product image, arrange a product image of a product in which the number of stock is a predetermined number or more, in the position before the change.

10. The information processing device according to claim 1, wherein
    the web page has a plurality of product images, and
    the image setting code is further configured to cause at least one of said at least one processor to set the display control amount of at least one of the plurality of product images based on the number of stock of the product.

11. The information processing device according to claim 1, wherein the web page generating code is further configured to cause at least one of said at least one processor to generate the web page described by a markup language, and the transmitting code is further configured to cause at least one of said at least one processor to transmit the web page described by the markup language to the terminal device.

12. An information processing method of processing information in an information processing device, including at least one processor, the method comprising:

acquiring, using said at least one processor, inventory information related to a number of stock of a product from a product storage that stores the inventory information, acquiring, using said at least one processor, a product image showing an image related to the product from a product image storage that stores the product image;

acquiring a table including product images in correspondence with respective number of stock and transmitting the table to the terminal device in advance;

generating, using said at least one processor, a web page for causing the product image to be displayed on a terminal device;

transmitting, using said at least one processor, the web page to the terminal device; and setting, using said at least one processor, a display control amount of a product image in response to the number of stock of the product, wherein, the product image changes gradually in response to a change in the number of stock of the product to visually indicate the number of stock of the product, while the stock of the product exists, and the acquiring the inventory information comprises acquiring the inventory information related to the number of stock through a network at a predetermined time interval.

13. A terminal device comprising:

at least one memory configured to store computer program code;

at least one processor configured to access said memory, read said computer program code, and execute according to said computer program code, said computer program code comprising:

information acquiring code configured to cause at least one of said at least one processor to:

acquire inventory information related to a number of stock of a product from a product storage device that stores the inventory information through a network at a predetermined time interval, and receive and store, in advance, a table including product images in correspondence with respective number of stock; and display code configured to cause at least one of said at least one processor to cause a product image, included in the table, related to the product to be displayed on a web page, wherein the information acquiring code is further configured to cause at least one of said at least one processor to acquire the inventory information from the product storage device, and wherein a display control amount of the product image is gradually set in response to a change in the number of stock of the product to visually indicate the number of stock of the product, while the stock of the product exists.

14. A non-transitory computer-readable storage medium having an information processing program recorded thereon which causes a computer, including at least one processor, to:

acquire, using said at least one processor, inventory information related to a number of stock of a product from a product storage that stores the inventory information, and acquiring a product image showing an image related to the product from a product image storage that stores the product image;

cause, using said at least one processor, the product image to be displayed on a web page of a terminal device; and set, using said at least one processor, a display control amount of a product image in response to the number of stock of the product, wherein, the product image changes gradually in response to a change in the number of stock of the product to visually indicate the number of stock of the product, while the stock of the product exists, and the information processing program further causes the computer to acquire a table including product images in correspondence with respective number of stock, transmit the table to the terminal device in advance, and acquire the inventory information related to the number of stock through a network at a predetermined time interval.

15. The non-transitory computer-readable storage medium according to claim 14, wherein the image setting step sets a size of the product image corresponding to the number of stock as the display control amount.

* * * * *